US011435075B2

(12) United States Patent
Minotti

(10) Patent No.: US 11,435,075 B2
(45) Date of Patent: Sep. 6, 2022

(54) MICRO-COMBUSTION DEVICE FOR THE GENERATION OF ELECTRICAL POWER

(71) Applicant: Angelo Minotti, Segni (IT)

(72) Inventor: Angelo Minotti, Segni (IT)

( * ) Notice: Subject to any disclaimer, the term of this patent is extended or adjusted under 35 U.S.C. 154(b) by 440 days.

(21) Appl. No.: 16/497,298

(22) PCT Filed: Mar. 26, 2018

(86) PCT No.: PCT/IB2018/052036
§ 371 (c)(1),
(2) Date: Sep. 24, 2019

(87) PCT Pub. No.: WO2018/173012
PCT Pub. Date: Sep. 27, 2018

(65) Prior Publication Data
US 2020/0378596 A1    Dec. 3, 2020

(30) Foreign Application Priority Data

Mar. 24, 2017   (IT) ........................ 102017000032837

(51) Int. Cl.
*F02B 43/08*    (2006.01)
*F23C 13/08*    (2006.01)
(Continued)

(52) U.S. Cl.
CPC .............. *F23C 13/08* (2013.01); *F02C 6/18* (2013.01); *H01M 8/0612* (2013.01); *F23C 2900/13001* (2013.01); *H01M 2250/402* (2013.01)

(58) Field of Classification Search
CPC .......... F23C 13/08; F23C 3/006; F23C 7/002; F23C 2900/13001; F23C 2900/03009;
(Continued)

(56) References Cited

U.S. PATENT DOCUMENTS 7,862,331 B2   1/2011  Norton et al.
2004/0121207 A1  6/2004  Bunker et al.
(Continued)

FOREIGN PATENT DOCUMENTS

DE   102005060516 A1   6/2007
WO      2010084525 A1   7/2010
(Continued)

OTHER PUBLICATIONS

International Search Report (ISR), dated Jul. 6, 2018, from corresponding international application No. PCT/IB2018/052036.

*Primary Examiner* — Hai H Huynh
(74) *Attorney, Agent, or Firm* — Nixon & Vanderhye

(57) ABSTRACT

A micro-combustion device generating electrical power raises global performance of the system, is compact, and reduces losses by utilizing an induced helical path. The device includes: injection ducts inserting a combustion agent, a fuel and/or a mixture thereof wherein the injection of the combustion agent takes place tangentially to the internal cylindrical wall, inducing a helical combustion path, the internal cylindrical walls of the chamber having a deposition of catalytic material to accelerate the combustion reaction; a turbo compressor group, including a compressor, feeding under pressure the combustion chamber through the injection ducts, and a turbine, receiving the flue gases from the discharge duct, compressor and turbine being keyed on the same axis, whereon a generator of electrical power, in turn, is keyed; and a fuel cell, fed by the flue gases through the turbine and by an oxidizing agent, implementing an electrochemical process generating additional electrical power.

20 Claims, 4 Drawing Sheets

(51) Int. Cl.
*F02C 6/18* (2006.01)
*H01M 8/0612* (2016.01)

(58) Field of Classification Search
CPC .. F02C 6/18; F02C 3/045; F02C 3/14; H01M 8/0612; H01M 8/0606; H01M 2250/402; H01M 2250/407; Y02B 90/10; Y02E 60/50; F23D 14/24; F23D 2900/00001
USPC ......... 123/1 A, 3, 559.1, 536, 543; 290/40 R
See application file for complete search history.

(56) References Cited

U.S. PATENT DOCUMENTS

| | | |
|---|---|---|
| 2008/0187789 A1 | 8/2008 | Ghezel-Ayagh |
| 2015/0243871 A1 | 8/2015 | Ollier |

FOREIGN PATENT DOCUMENTS

| | | |
|---|---|---|
| WO | 2014048992 A1 | 4/2014 |
| WO | 2016116450 A2 | 7/2016 |

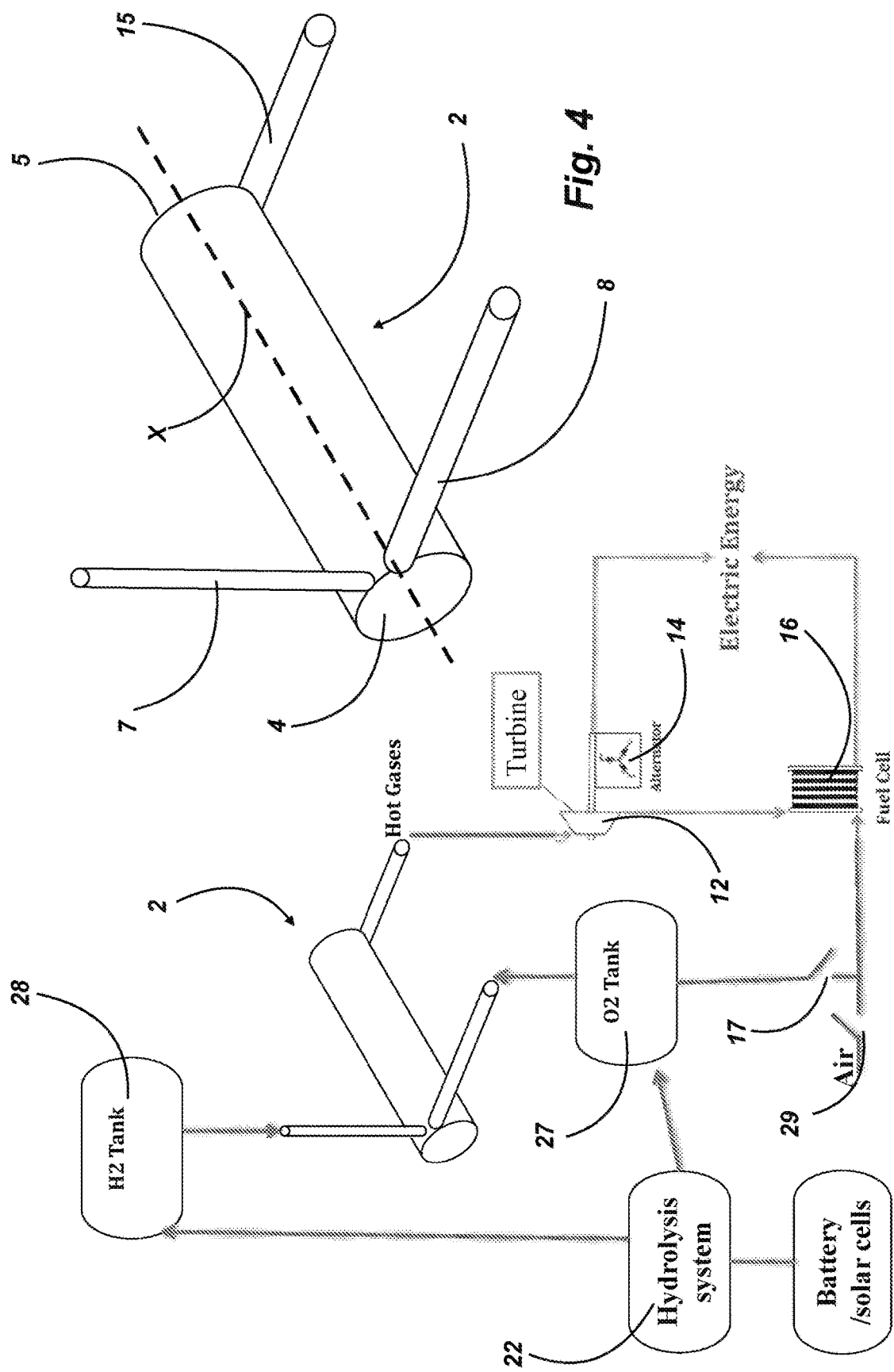

MICRO-COMBUSTION DEVICE FOR THE GENERATION OF ELECTRICAL POWER

The present invention relates to a micro-combustion device for the generation of electrical power, of the type using a combustion chamber, wherein the inner fluidodynamics thereof is characterized by helical motion thanks to the particular mode for injecting fuel and oxidant. They can be introduced separately or, in case, pre-mixed.

The chamber can be micro, meso or macro, depending upon the requested final power. Under microchamber a combustion chamber is meant with reference sizes equal or smaller than the millimetre; under mesochamber a combustion chamber is meant with reference sizes in the order of millimetres; under macrochamber a combustion chamber is meant with reference sizes in the order of centimetres. A reference size can be for example the diameter.

An example of device as mentioned above can be found in the U.S. Pat. No. 7,862,331 A, wherein a planar combustion chamber is described, obtained between two foil-like elements placed side by side at a distance in the order of millimetres. The combustion is induced catalytically and the generated heat is exploited thermoelectrically, by obtaining electrical power.

Another example of microchamber, still having foil-like shape, is described in the International patent application n. WO 2014/048,992 A1, wherein the heat is exploited to heat a surface, the hot one already subjected to solar heating, in a thermoelectric system.

At last, the International patent application n. WO 2016/116,450 A2 describes a combustion micro or mesochamber wherein the oxidation reaction is improved by inserting the flow of combustion agent tangentially to a circular wall, so as to induce in the chamber itself a helical rotation motion of the combustion on its walls, thus by expanding the path therethrough the combustion reaction is implemented, by improving the performance thereof.

However, these examples of combustion chambers are used with the purpose of obtaining an increase in the temperature gradient in a restricted area with the purpose of exploiting it with thermoelectric elements which exploit the so-produced differences in temperature.

However, in this way, the global and/or combustion performance does not reach high values, as the heat generated to heat thermoelectric elements is easily subjected to hardly controllable dispersions.

The technical problem underlying the present invention is to provide a device, potentially with very reduced sizes and which uses the combustion for generating electricity, allowing to obviate the drawback mentioned with reference to known art.

Such problems are solved by a device as specified above, defined by the enclosed claim 1.

In particular, the invention relates to a device for the generation of electrical power comprising a combustion chamber implemented by means of an elongated cylindrical container, developing along a longitudinal axis, having an inlet end, a discharge end with a discharge duct and internal cylindrical walls.

In this combustion chamber, at the inlet end one or more injection ducts are provided for inserting a combustion agent, a fuel and/or a mixture thereof, arranged perpendicularly to said longitudinal axis. The injection of said combustion agent takes place tangentially to the internal cylindrical wall, so as to induce a helical combustion path. On this regard, le internal cylindrical walls have a deposition of catalytic material, in order to accelerate the combustion reaction.

The device further comprises a turbo compressor group, having a compressor, feeding under pressure said combustion chamber through said one or more injection ducts, and a turbine, receiving the flue gases from said discharge duct; the compressor and the turbine are keyed on the same axis, whereon a generator of electrical power, in turn, is keyed.

At last, a fuel cell is provided which is fed by the flue gases coming from the turbine and, if necessary, by an additional oxidising agent, with the purpose of generating additional electrical power through an electrochemical process.

According to a variant, the combustion chamber is fed by respective tanks of combustion agent and fuel in gaseous form and under pressure, so that the presence of the compressor is no more required and only the turbine receives the flue gases from the discharge duct of the combustion chamber.

Advantageously, such tanks can feed the combustion chamber with gaseous oxygen and hydrogen under pressure, produced by a electrolytic system which, in case, can be fed by electric current coming from photovoltaic cells or other, even renewable, energy source.

The main advantage of the device, according to the present invention, lies in the fact of raising the global performance of the system, thus obtaining a very compact device and fewer losses by exploiting the principles underlying the chamber, with helical motion and catalytic walls, and underlying the thermoelectric effect.

The present invention will be described hereinafter according to a preferred embodiment example thereof, provided by way of example and not for limitative purposes with reference to the enclosed drawings wherein:

FIG. 3 illustrates a functional scheme of a third example of micro-combustion device for the generation of electrical power according to the present invention;

FIG. 4 shows a perspective view and a functional scheme of a component of the device of FIG. 1, that is the combustion chamber with helical path;

Figure 1:
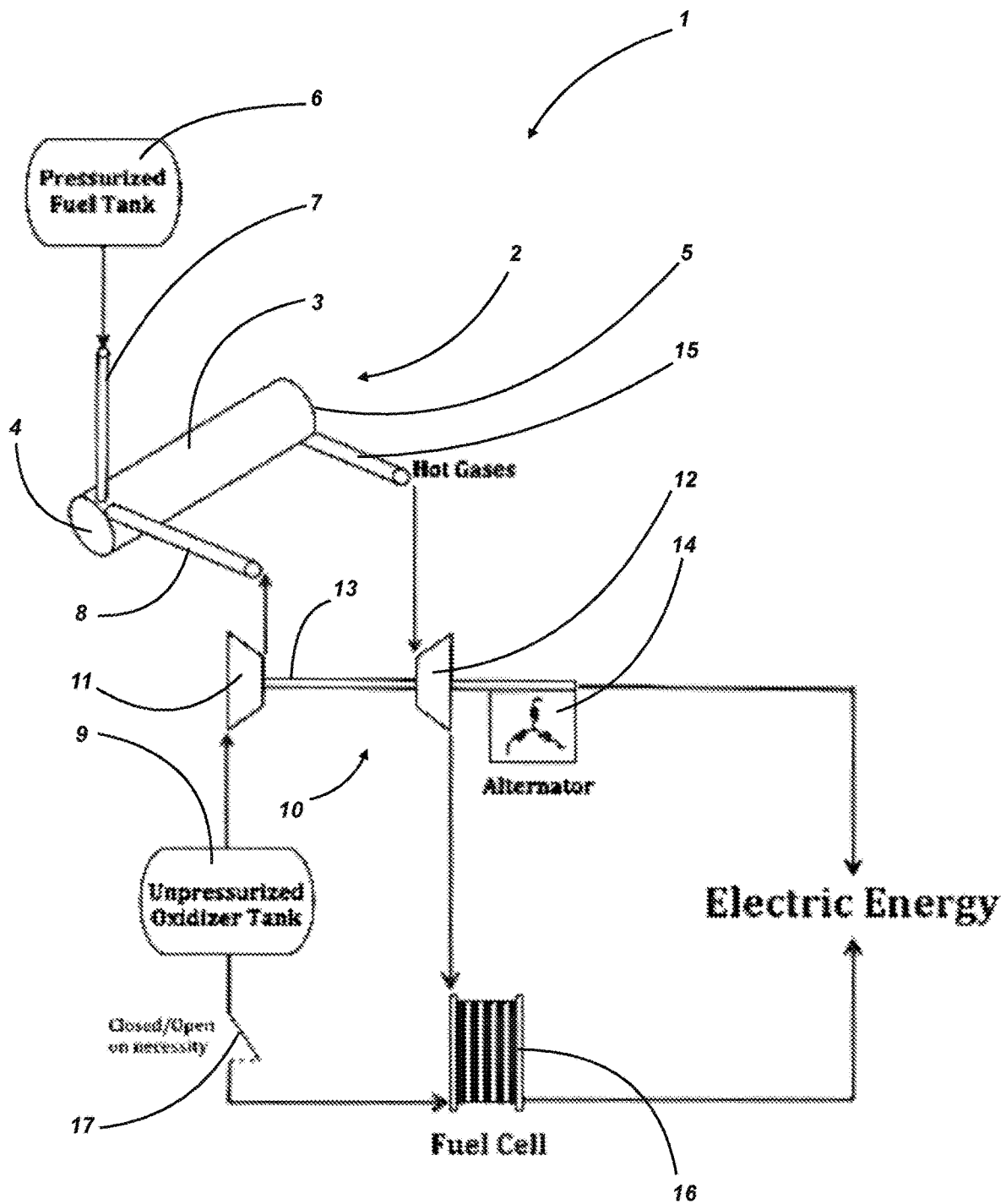
FIG. 1 illustrates a functional scheme of a first example of micro-combustion device for the generation of electrical power according to the present invention.

With reference to the figures, and in particular to FIG. 1, a micro-combustion device for the generation of electrical power is designated as a whole with 1.

It comprises a combustion chamber 2 implemented by means of an elongated cylindrical container 3 developing along a longitudinal axis X.

The container 3 has a first end 4 threat there are one or two injection ducts. The fuel, the oxidising agent or a mixture thereof is injected through these ducts. The tangential position of the duct of the oxidising agent, or of the mixture of the same, imposes a helical motion to the flow that will react; said first end 4 can be then identified as inlet end. The container 3 further has a second end 5, or discharge end 5, threat the discharge of the gaseous products of the combustion takes place at the end of said helical path, through the discharge duct.

On this regard, the device 1 comprises a first tank 6 including fuel which is supplied at a certain pressure, for example hydrogen under pressure or a gaseous hydrocarbon, such as methane, or liquid hydrocarbon, such as for example GPL. The first tank 6 is connected through a first injection duct 7, which is arranged perpendicularly both to said longitudinal axis X and to the cylindrical wall in the connection point (FIG. 1).

In the same way, in the present example, the device comprises a second injection duct 8 providing an oxidising agent or combustion agent, for example air or oxygen, to the combustion chamber 2.

The second injection duct 8, the supply thereof is described hereinafter, is arranged perpendicularly to said longitudinal axis X and tangentially to the internal cylindrical wall of the container 3, so as to induce a helical path to the flow. Such helix will unwind for the whole extension of the combustion chamber 2, as far as the discharge end thereof, by lengthening considerably the path of the combustion reaction and then even the relative residence time of the reagents.

On this regard, it is to be noted (FIG. 4) that the second injection duct 8 injects a flow of oxidising agent entering the combustion chamber as first one with respect to the fuel; in fact, the first duct 7, injecting perpendicularly the fuel flow, is staggered by 90° with respect to the second duct 8.

It is to be meant that, in other particular applications, fuel and combustion agent could be injected already mixed.

By pure way of example, with a mesocombustion chamber having diameter equal to 6.0 mm and length equal to 30.0 mm, thanks to the lengthening of the path of the induced combustion reaction, the residence time of the reagents changes from a time lower than $10^{-4}$ s to 0.08 s.

The internal cylindrical walls of the cylindrical container 3 have deposition of catalytic material inducing the combustion reaction between fuel and combustion agent. Preferably, the catalytic material mainly comprises Platinum.

Thanks to the catalytic material, the temperature triggering the oxidation reaction is lowered down. In a preferred version of the device, such lowering down, together with the lengthening of the combustion path, allows to ignite the combustion reaction with flame development without any outer ignition intervention being required.

Additionally, the device can be provided with the means for heating the combustion agent and/or means to induce heating of the combustion chamber from its exterior, for example by means of electrical resistances applied on the outer surface of the combustion chamber.

In each case, it is to be meant that the combustion chamber is implemented as one single piece, and it has only the apertures required to the injection and to the discharge.

Therefore, this combustion chamber exploits fluidodynamics and chemistry to increase to the maximum the residence time of the combustion and to reduce to the minimum the time of chemical kinetics by said catalytic deposition. These solutions allow to simplify the construction of the combustion chamber by reducing, at the same time, the sizes thereof.

The device 1 then comprises a second tank 9 comprising an oxidising agent or combustion agent, for example air or oxygen, which has to be fed in the combustion chamber 2 at a certain pressure.

On this regard, the device 1 comprises a turbo compressor group 10 extracting the combustion agent from the second tank 9 and injects it in the combustion chamber 2 through said second injection duct 8.

The turbo compressor group 10 comprises a compressor 11 and a turbine 12 keyed on the same axis 13, whereon a generator of electrical power 14, in particular an alternator, in turn, is keyed.

The turbine 12 is fed by the products of the combustion under pressure, ejected from the combustion chamber at the discharge end 5 of the cylindrical container 3 wherein a discharge duct 15 is provided.

The discharge duct 15, in an example, branches perpendicularly to the longitudinal axis X of the cylindrical container 3, and tangentially to its internal cylindrical wall.

Figure 6:
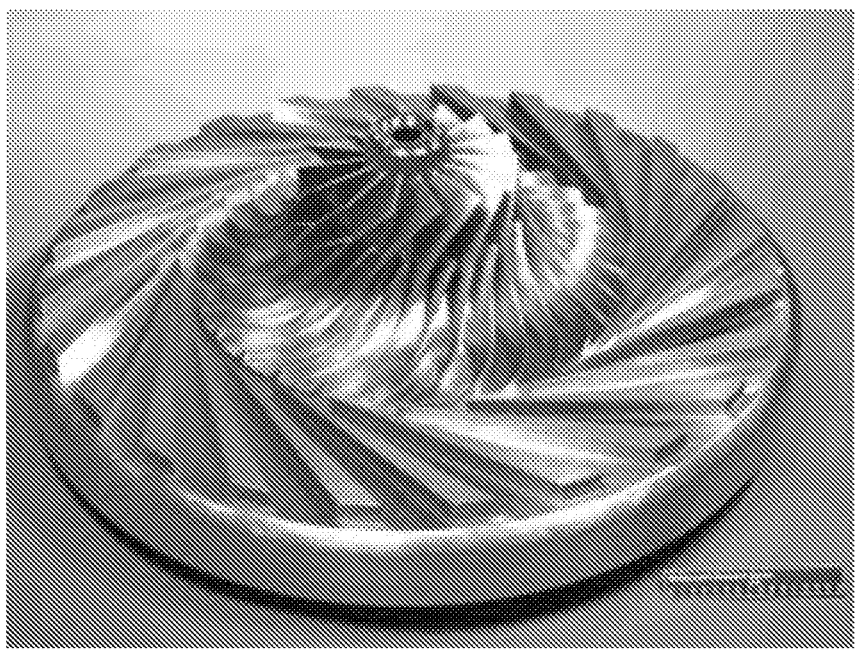
FIG. 6 shows an image of an additional component of the device of FIG. 1.

The compressor 11 can be of centrifugal type and comprises a centrifugal impeller represented by way of example in FIG. 6.

Figure 5:
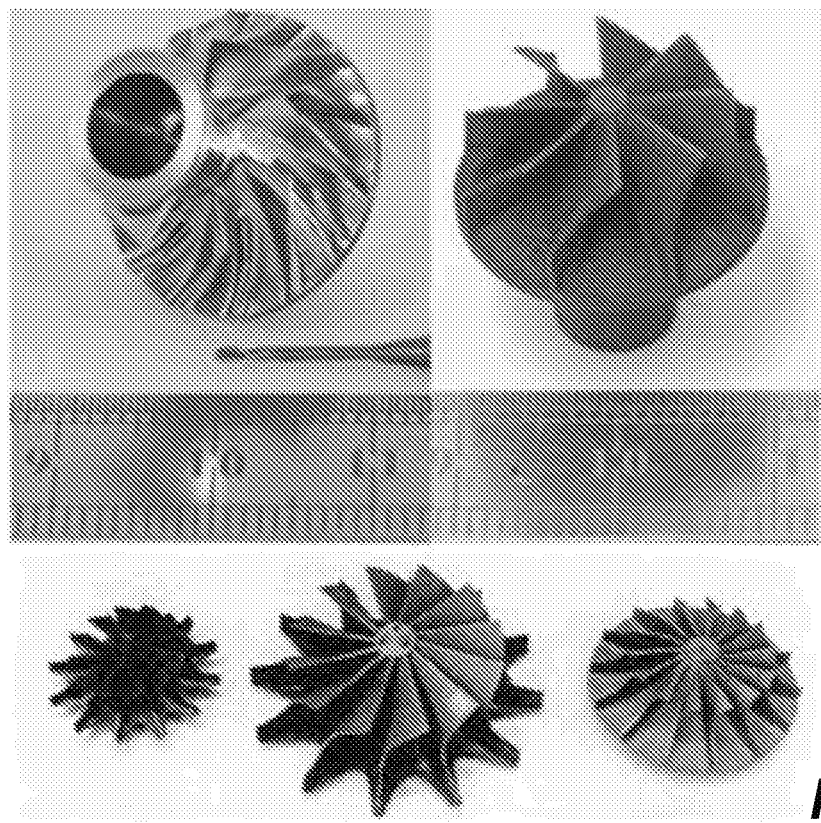
FIG. 5 shows an image of some variants of another component of the device of FIG. 1.

The turbine 12, too, can be of centrifugal type and comprises a relative centrifugal impeller, represented in some possible examples in FIG. 5.

The turbo compressor group 10 has to be able to rotate at adequate regimes, which for the chambers having more reduced sizes can be higher or equal to $0.4*10^6$ rpm, and has to have available adequate bearings.

The discharge of the turbine is connected to a fuel cell 16 of the device 1, thus receiving, together with the products of the combustion, even an amount of unburnt fuel and/or an amount of unburnt oxidising agent, the reaction in the combustion chamber 2 being in case imperfect.

The second tank 9, to this regard, if required, feeds the fuel cell 16 through a reducer 17 which, on this regard, can be open, partially open or closed.

The fuel cell 16 contributes to the production of electrical power together with the alternator 14, thanks to an electrochemical reaction inside thereof.

Figure 2:
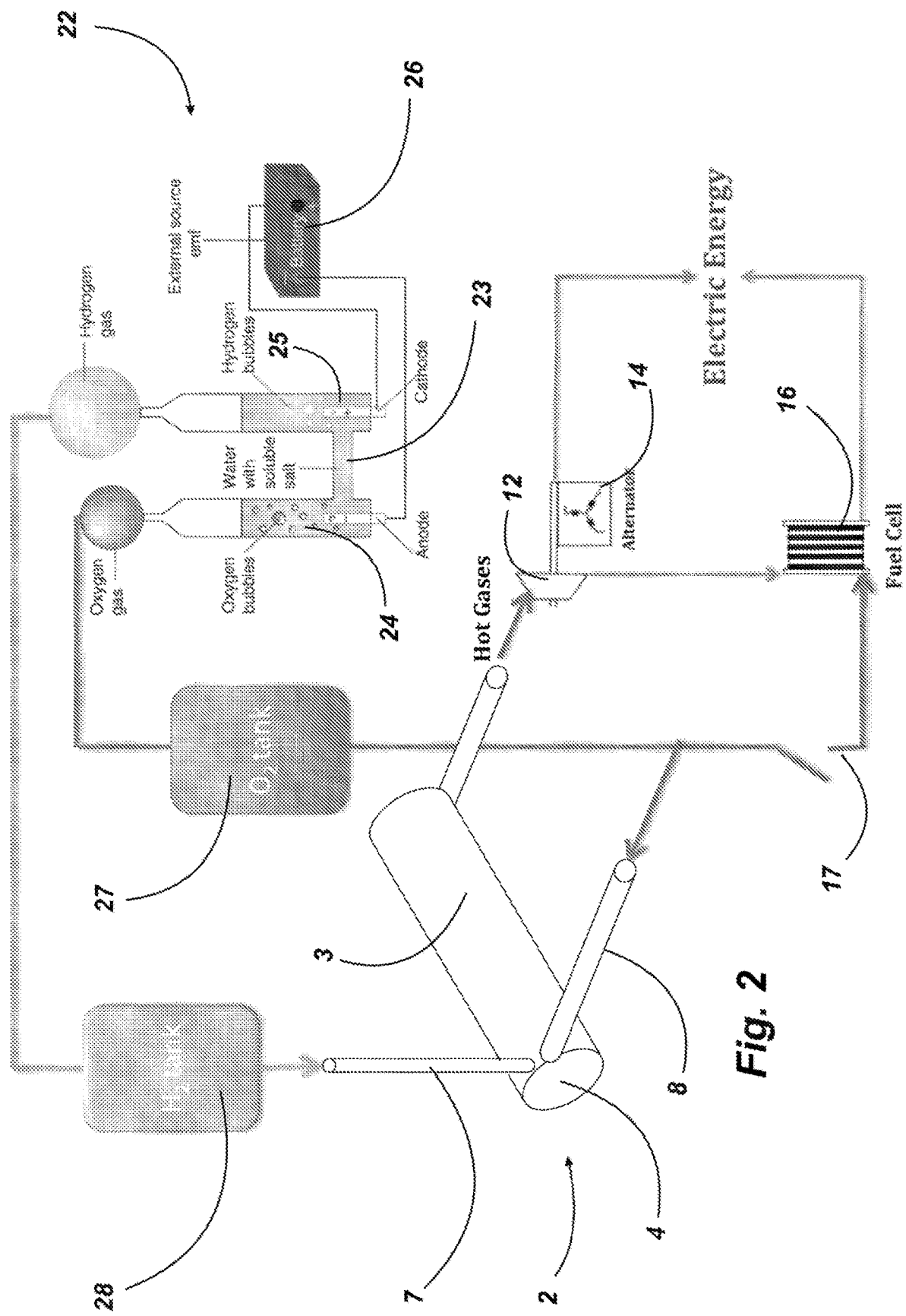
FIG. 2 illustrates a functional scheme of a second example of micro-combustion device for the generation of electrical power according to the present invention.

With reference to FIGS. 2 and 3, two additional embodiment examples of the micro-combustion device according to the invention are described; they are fed by using Hydrogen as fuel and Oxygen as combustion agent.

These two examples are characterized by the presence of an electrolytic system (electrolysis), upstream of the combustion chamber, which supplies, to the chamber itself, gaseous hydrogen and oxygen from liquid water, in case even suitably treated sewage, waste or rain water.

Moreover, for the generation of electrical power the compressor absence is to be noted, since the fuel and the combustion agent ($H_2$ and $O_2$) are accumulated in specific tanks, after their production, and inserted in chamber once the plan pressure is reached.

The amount of used fuel being equal, this system distinguishes for the production of a greater amount of electrical power, per fuel unit and volume unit, with respect to what happens in common generators.

This is due both to the features already shown in the configuration with hydrocarbons (chamber with helical motion, walls with catalytic deposition, etc.) and since hydrogen is the element with highest heating power and, additionally, since there is no compressor, and in a turbo compressor system it is estimated that about ⅓ of the energy produced by the turbine is used to move the compressor.

In the first one of these two examples (FIG. 2), the device 1 comprises an electrolytical system 22 to break down liquid water, transported in a tank 23, into gaseous hydrogen and oxygen.

The electrolytical system 22 comprises an anode 24 and a cathode 25 which are subjected to an electric voltage generated by a battery 26, which, in turn, can be charged by a possible photovoltaic or wind system or by any other, even renewable, source.

It is to be meant that the battery 26 is only a possible example of electrical power source among the possibly used ones.

The gaseous oxygen and hydrogen gurgle in the respective branches of the tank 23 at the anode 24 and of the cathode 25, respectively. Then, they feed a respective tank of oxygen 27 and a respective tank of hydrogen 28 under pressure.

As it is known, the water should be at least weakly dissociated in ions to allow the passage of electric current. On this regard, it will include an adequate amount of an electrolyte, for example a dissolved acid or a salt.

The above-mentioned tanks can be useful should a gas injection higher than the production capacity of the electrolytic system be requested.

The liquid water in case can come even from systems for recovering (suitably treated) rain or waste water and electric energy, required to make the electrolytical system to operate, can be acquired in case even by systems for accumulating/treating energies from renewable sources such as, for example the solar or wind source.

In the example of FIG. 3, the battery producing the electrolysis in the electrolytical system 22 is specifically fed by solar cells.

Moreover, the fuel cell 16 can be fed even by an air duct 29.

The water vapor, going out from the turbine or the fuel cell, can also:
1) be made to condense, through a suitable system, to be transformed again into liquid water and then to be recovered for other uses such as, for example, as additional liquid fuel for the same device for the generation of energy;
2) be inserted, directly at the vapour state, in an additional device for the generation of energy (high temperature electrolysis) downstream of the first one, and in series (identical or not to the first one).

Among the advantages allowed by the above-described electrolysis-fed solutions it is worth mentioning:
1. the liquid water has high density (reduced volumes), it is cheap, safe, it requires low electrical power (nominally 1.23 V, obtainable even from solar cells) in order to be broken down into hydrogen and oxygen and not requiring high pressure tanks;
2. hydrogen and oxygen are broken down into stoichiometric proportions, which guarantees the highest combustion temperature, and their combustion produces water vapour only;
3. the combustion chamber with helical path combustion allows to have high combustion effectiveness in smaller volumes than those used with reciprocating engines, it has no rotating portions and it does not require lubrication;
4. the deposition of catalytic material, on the walls inside the chamber, allows to further reduce the characteristic sizes of the combustion chamber and, used as "igniting device" even by means of the recirculation bubble acting as flame anchoring, allows to simplify the ignition system until, in case, removing it completely;
5. the turbine can be planned to work with fixed point and reach even high degrees of effectiveness depending upon the size;
6. the electrolytical system would allow to free itself from using the compressor (hydrogen and oxygen can be accumulated in specific tanks and brought to the pressure of interest), thus allowing to obtain more electric energy per flue gas unit;
7. the possible fuel cell takes advantage in working at high temperatures, then the thermochemical features of still hot gases, outgoing from the turbine, allow to raise the cell effectiveness, potentially even with additional supply of oxidising agent from outside; and
8. modularity/scalability of the system, that is it can be planned depending upon the required energy.

Therefore, in the light of what above described, the micro-combustion device of the present invention provides to integrate different technologies such as a combustion chamber with a helical motion of the combustion products, a catalytic deposition accelerating the combustion, a turbo compressor group or one single turbine, a fuel cell and in case a electrolysis system ad system for treating/purifying water. Thanks to this integration, the amount of used fuel being equal, this system is capable of producing a greater amount of electrical power with respect to what takes place by means of common generators, and with more reduced volumes.

The heating power of one single fuel charge is then transformed into electrical power both through the alternator and the fuel cell.

The advantages connected to the above-described device are then numerous. The combustion chamber, with helical motion, allows to have high combustion effectiveness in reduced volumes with respect to those used in engines of reciprocating type, it has no rotating portions and does not require any form of lubrication.

Moreover, the deposition of catalytic material on the inner walls of the combustion chamber allows to further reduce the sizes of the combustion chamber, and to simplify the ignition system, until potentially removing it completely.

Therefore, the structural simplicity of the combustion chamber allows it to use different fuels and oxidising agents.

Additionally the turbine can be planned to work "at fixed point" and reach even high levels of effectiveness depending upon its size.

The fuel cell takes advantage in working at high temperature, thanks to the hot gases outgoing from the turbine, thus increasing the effectiveness of the cell itself.

At last, the system is suitable to have an excellent modularity, and it could be designed depending upon the required energy, thus reducing the characteristic sizes thereof.

This device is further suitable to have several applications, depending upon the required energy, for example as range extender for the electric traction transportation; or for the production of energy in complex situations, such as in hospital and/or military fields, or aboard vehicles such as ships or aircrafts, drones, exoskeletons or on orbital satellites; or even in fixed applications, wherein the production of energy localized in a limited area is required, to feed emergency systems, computer, telecommunication apparatuses and so on.

It has further to be considered that the structural simplicity of the combustion chamber allows it to use several fuels and oxidising agents, since it is one single block of material with simple cylindrical injection and discharge holes, without other holes determined by means for igniting the combustion.

To the above-described devices for the generation of electrical power, a person skilled in the art, with the purpose of satisfying additional and contingent needs, could introduce several additional modifications and variants, however all comprised within the protective scope of the present invention, as defined by the enclosed claims.

The invention claimed is:

1. A micro-combustion device (1) for generation of electrical power, comprising:
   a combustion chamber (2) implemented by means of an elongated cylindrical container (3) developing along a longitudinal axis (X), having an inlet end (4), a discharge end (5) with at least a discharge duct (15), and internal cylindrical walls, wherein:
      at the inlet end (4) one or more injection ducts (7, 8) are provided for inserting a combustion agent, a fuel, and/or a mixture thereof, arranged perpendicularly to said longitudinal axis (X), wherein at least an injection of said combustion agent takes place, tangentially to an inner cylindrical wall so as to induce a helical combustion path, and
      the internal cylindrical walls have a deposition of catalytic material, to induce a combustion reaction;
   a turbo compressor group (10), comprising a compressor (11), feeding under pressure said combustion chamber (2) through said one or more injection ducts (8), and a turbine (12), receiving flue gases from said discharge duct (15), said compressor (11) and said turbine (12) being keyed on a same axis (13), whereon a generator (14) of electrical power, in turn, is keyed; and
   a fuel cell (16), fed by the flue gases through said turbine (12) and by an oxidising agent, implementing an electrochemical process for generation of additional electrical power.

2. The micro-combustion device (1) according to claim 1, further comprising:
   a first injection duct (7) for a fuel; and
   a second injection duct (8) for the combustion agent,
   the second injection duct (8) being arranged perpendicularly to said longitudinal axis (X) and tangentially to the internal cylindrical wall of the container (3), so as to induce a helical path to a flow and to the combustion reaction.

3. The micro-combustion device (1) according to claim 2, wherein the first injection duct (7) is staggered by 90° with respect to so that the fuel is invested by a flow of oxidising agent.

4. The micro-combustion device (1) according to claim 1, further comprising:
   a tank (9), configured to store an oxidising agent or combustion agent to be fed to the combustion chamber (2) at a certain pressure through a turbo compressor group (10), which extracts the oxidising agent or combustion agent from the tank (9) and injects the oxidising agent or combustion agent into the combustion chamber (2).

5. The micro-combustion device (1) according to claim 1, wherein said turbo compressor group (10) can rotate at a regime even higher or equal to $0.4*10^6$ rpm.

6. The micro-combustion device (1) according to claim 1, further comprising:
   a tank (9), including an oxidising agent or combustion agent, and which feeds said fuel cell (16) through a reducer (17) configured to be any of open, partially open, or closed.

7. The micro-combustion device (1) according to claim 1, wherein the combustion chamber (2) is implemented as one single piece with injection and discharge apertures as single openings.

8. The micro-combustion device (1) according to claim 1, wherein the catalytic material mainly comprises Platinum.

9. The combustion device (1) according to claim 1, wherein said catalytic material lowers a temperature for triggering the oxidation reaction so that, together with a lengthening of the combustion path, allows auto-ignition of the combustion reaction with flame development.

10. The micro-combustion device (1) according to claim 1, wherein the combustion chamber (2) is provided with means to induce heating of the combustion chamber (2) from an exterior thereof.

11. The micro-combustion device (1) according to claim 10, wherein the means to induce the heating of the combustion chamber (2) from the exterior comprises electrical resistances applied on an outer surface of the combustion chamber (2).

12. The micro-combustion device (1) according to claim 1, further comprising:
   means for heating the combustion agent.

13. A micro-combustion device (1) for generation of electrical power, comprising:
   a combustion chamber (2) implemented by means of an elongated cylindrical container (3) developing along a longitudinal axis (X), having an inlet end (4), a discharge end (5) with at least a discharge duct (15), and internal cylindrical walls, wherein:
      at the inlet end (4), injection ducts (7, 8) are provided for respective insertion of a combustion agent and of a fuel in gaseous form, arranged perpendicularly to said longitudinal axis (X), wherein at least an injection of said combustion agent takes place, tangentially to an internal cylindrical wall so as to induce a helical combustion path, and
      the internal cylindrical walls have a deposition of catalytic material, to induce a combustion reaction;
   respective tanks (27, 28) for combustion agent and fuel in gaseous form, to feed the combustion agent and the fuel in gaseous form through said injection ducts (7, 8);
   a turbine (12), that receives flue gases from said discharge duct (15), keyed on an axis (13) of a generator (14) of electrical power; and
   a fuel cell (16), fed by the flue gases through said turbine (12) and by an oxidising agent, implementing an electrochemical process for generation of additional electrical power.

14. The micro-combustion device (1) according to claim 13, wherein the fuel and combustion tanks are tanks of hydrogen (28) and oxygen (27) under pressure.

15. The micro-combustion device (1) according to claim 14, wherein the tanks of hydrogen (28) and oxygen (27) under pressure are fed by an electrolysis system (22).

16. The micro-combustion device (1) according to claim 15, wherein the electrolysis system (22) is fed by photovoltaic cells.

17. The micro-combustion device (1) according to claim 15, wherein the electrolysis system (22) is fed by a vapour outletting the turbine (12).

18. The micro-combustion device (1) according to claim 17, wherein the vapour outletting the turbine (12) is configured to condense in a condenser.

19. The micro-combustion device (1) according to claim 15, wherein the electrolysis system (22) is fed by waste water, sewage, and/or rain water with a related preliminary treatment.

20. The micro-combustion device (1) according to claim 13, further comprising:
   a first injection duct (7) for a fuel; and
   a second injection duct (8) for the combustion agent,
   the second injection duct (8) being arranged perpendicularly to said longitudinal axis (X) and tangentially to the internal cylindrical wall of the container (3), so as to induce a helical path to a flow and to the combustion reaction.

\* \* \* \* \*